United States Patent [19]
Feucht

[11] 3,856,052
[45] Dec. 24, 1974

[54] HOSE STRUCTURE

[75] Inventor: Robert H. Feucht, Cuyahoga Falls, Ohio

[73] Assignee: The Goodyear Tire and Rubber Company, Akron, Ohio

[22] Filed: July 31, 1972

[21] Appl. No.: 276,629

[52] U.S. Cl. .................. 138/119, 138/124, 138/172
[51] Int. Cl. ............................................. F16l 11/10
[58] Field of Search .................. 138/119, 124–139, 138/153, 172; 141/388

[56] References Cited
UNITED STATES PATENTS

| | | | |
|---|---|---|---|
| 1,053,933 | 2/1913 | Stowe | 138/119 |
| 1,100,829 | 6/1914 | Joseph | 138/119 |
| 1,164,303 | 12/1915 | Nicewarner | 138/119 |
| 1,301,354 | 4/1919 | Baird | 138/119 |
| 3,374,806 | 3/1968 | Skinner | 138/119 |

Primary Examiner—Houston S. Bell, Jr.
Attorney, Agent, or Firm—F. W. Brunner; R. P. Yaist

[57] ABSTRACT

A material transporting hose of integral construction having a body of flexible, resilient material which includes a pair of longitudinally reinforced portions disposed on opposite sides of the cross-section of the body. The portions include at least one elongated reinforcing member embedded therein extending generally parallel to the longitudinal axis of the hose to provide longitudinal strength. The longitudinally reinforced portions have a total combined perimeter which is equal to or less than the total combined perimeter of the remaining portions of the cross-section of the hose body which do not contain longitudinal reinforcing members so that at least one-half of the hose remains flexible in a longitudinal direction for ease of handling. The hose structure is particularly useful for long length, fluid transporting hose used in ship-to-shore and ship-to-ship refueling.

17 Claims, 6 Drawing Figures

PATENTED DEC 24 1974 3,856,052

HOSE STRUCTURE

BACKGROUND OF THE INVENTION

This invention relates to a flexible, material transporting hose and more particularly to an improved structure for such hose. This invention specifically relates to long length, fluid transporting hose for ship-to-shore and ship-to-ship refueling.

In supplying fuel to or receiving fuel from ships or other vessels, it has been customary to use long lengths of coupled hose strung between the ship and the shore or between ships. In order to prevent excessive tension at the ends of the hose lines, separate steel cables running parallel to the hose and connected thereto by means of eyelets on the couplings have been used to protect the hose from these tension forces. This procedure, however, is cumbersome and dangerous since two separate reels must be used, one for the hose and one for the cable. Furthermore, the cable often chafes the hose in deployment causing premature failure of the hose to occur. In other forms of refueling where the hose is deployed behind the stern of a moving ship the drag on the hose line due to friction causes the hose to elongate with the inside dimensions of the hose being significantly reduced. This results in the constriction of the hose opening thereby reducing the quantity of fuel flowing through the hose.

Because of the high stresses to which the hose is subjected, it has heretofore often been the practice in the construction of refueling hose to use a spiral-shaped, wire reinforcement within the hose. However, this hose structure tends to deform or kink when subjected to tension or tensile forces and the repeated bending forces caused by waves due to rough seas. In the prior art, Kuwabara U.S. Pat. No. 3,613,736 discloses a hose end structure of stranded wire reinforcement extending along the axial direction of the hose and disposed around its entire circumference. Although this structure increases the strength of the hose end, it is not suitable for the entire hose length since the hose will not be sufficiently flexible for reeling upon itself. For this reason, a hose construction of this type is not suitable for light or medium duty refueling hose, for example having an inside diameter of 6 or 7 inches.

The foregoing disadvantages have been overcome by the hose structure of the present invention which will be hereinafter described.

OBJECTS OF THE INVENTION

It is an object of the present invention to provide a material-transporting hose having longitudinal strength and stability but yet being flexible in the longitudinal direction so that it may be easily reeled upon itself and less likely to deform or develop kinks.

It is another object of the present invention to provide a fluid transporting hose such as a refueling hose which will not require a separate cable running parallel to the hose in order to protect the hose from excessive end loads but which is flexible enough to be easily reeled upon itself.

It is still another object of the invention to provide a refueling hose which will not elongate unduly during use causing excessive constriction of the hose opening but which will remain sufficiently flexible so that it may be easily reeled upon itself.

It is a further object of this invention to provide a system for transporting fuel in which an improved refueling hose structure is used that is capable of withstanding longitudinal tensile stresses while still remaining capable of bending in one plane in order to be more easily reeled upon itself and less likely to deform or develop kinks.

Other objects and advantages of this invention will become apparent hereinafter as the description thereof proceeds, the novel features, arrangements and combinations being clearly pointed out in the specification as well as the claims thereunto appended.

It has been found that the foregoing objects and advantages are accomplished by a material-transporting hose of integral construction comprising a body of flexible resilient material, a pair of longitudinally reinforced portions disposed on opposite sides of the cross section of the body with each portion having at least one elongated reinforcing member embedded therein extending generally parallel to the longitudinal axis of the hose to provide the hose with longitudinal strength, and remaining portions free of the reinforcing members disposed adjacent to the longitudinally reinforced portions on each side thereof. The longitudinally reinforced portions have a total combined perimeter equal to or less than the total combined perimeter of the remaining portions of the cross section of the body therebetween to provide a hose construction in which at least one-half of the hose remains flexible in a longitudinal direction thereby enabling the hose to be more easily reeled upon itself and less likely to develop kinks.

The foregoing objects and advantages are also accomplished by the use of a fluid transporting hose of a generally circular cross-sectional configuration having a body of flexible elastomeric material and a pair of longitudinally reinforced strips disposed on diametrically opposite sides of the cross section of the body. The strips include a plurality of elongated reinforcing cords embedded therein and disposed in at least one layer extending generally parallel to the longitudinal axis of the hose to provide the hose with longitudinal strength thereby resisting undue constriction of the hose opening. The remainder of the cross section of the body is free of the reinforcing cords. The strips have a total combined width or circumferential dimension substantially less than the width or circumferential dimension of the remainder of the cross section of the body to provide an integral hose construction in which a majority of the hose remains flexible in a longitudinal direction thereby enabling the hose to be more easily reeled upon itself and less likely to develop kinks.

The above objects and advantages are also accomplished in a system for refueling ships or supplying fuel from ships to facilities located on shore or to another ship including the combination of a plurality of refueling hose, means for coupling the hose together in an end-to-end relationship and means for reeling the coupled hose before and after use wherein each hose comprises the structure of the present invention.

PREFERRED EMBODIMENTS OF THE INVENTION

Figure 1:
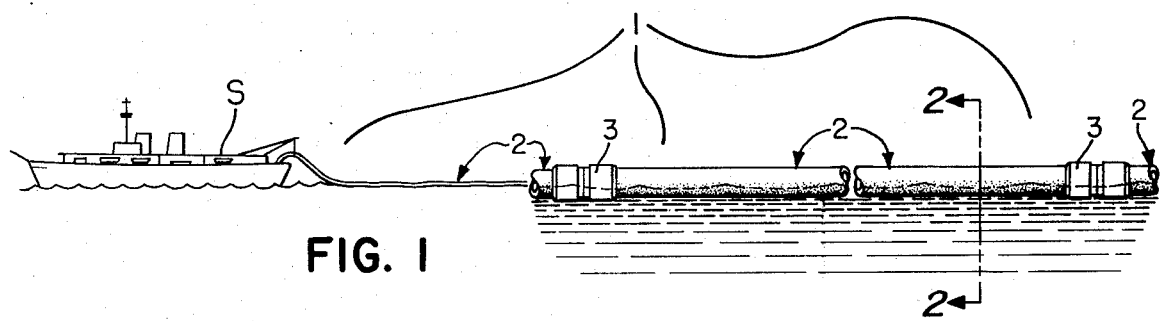
FIG. 1 is a fragmentary side elevational view showing the hose of this invention as deployed in ship-to-shore or ship-to-ship refueling procedures.

In FIG. 1, a portion of a refueling system 1 is shown in which the material-transporting hose 2 of this invention may be used. A plurality of hose segments are connected together in an end-to-end relationship by means of couplings 3 to form a hose line and the hose 2 is often deposited into a body of water and floats on the water to reach its destination with one end of the hose line connected to a source of fuel (not shown), for example located aboard a ship S. The fuel, such as petroleum based oil, is then capable of being transported either from ship-to-shore or ship-to-ship.

Figure 2:
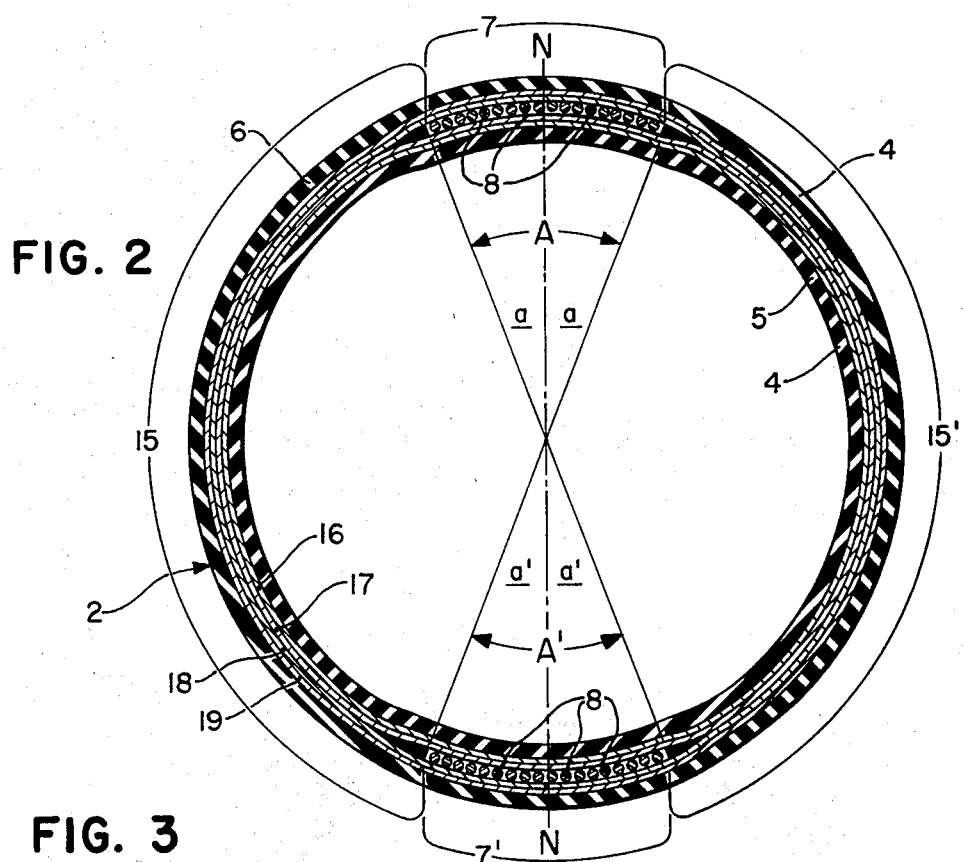
FIG. 2 is an enlarged sectional view taken on line 2—2 of FIG. 1.
Figure 3:
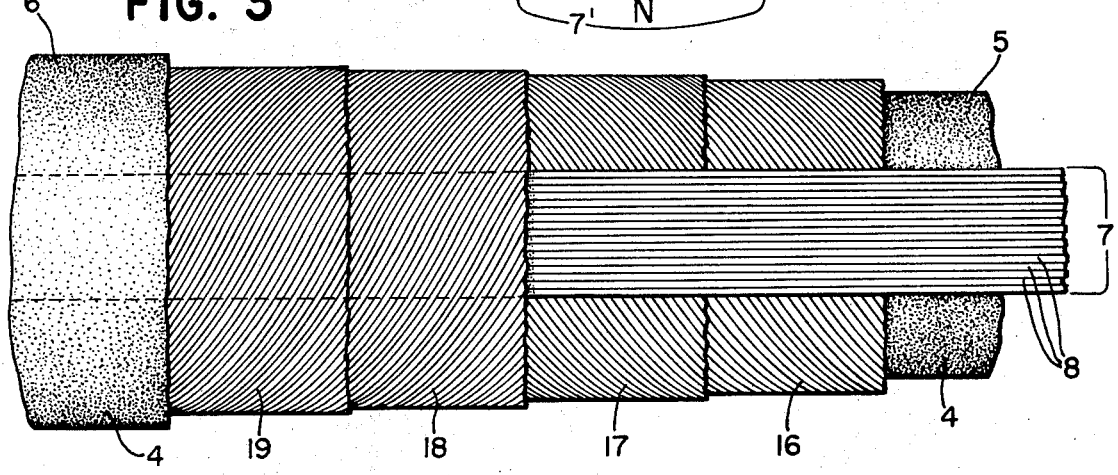
FIG. 3 is a plan view of the hose of FIG. 1 with parts broken away to more clearly show the invention.

The hose structure is best shown in FIGS. 2 and 3. The hose 2 in this instance is a fuel-transporting hose having a generally circular cross-sectional configuration with an inside diameter of about 6 inches. It is to be understood that the circular configuration is only illustrative and the hose may be of other cross-sectional configurations such as elliptical or rectangular. The hose includes a body 4 of flexible resilient material preferably comprised of a fabric-reinforced elastomer such as natural or synthetic rubber or the like. The body 4 ordinarily includes an inner tube 5 and an outer cover 6 of elastomeric material. Since the hose is meant primarily for use in salt water, it is preferred that the elastomeric material of the tube 5 and cover 6 be suitable for exposure to this type environment. For example, the tube 5 of the hose 2 may be composed of compounded nitrile rubber and the cover 6 may be composed of compounded blends of nitrile rubber and polyvinyl chloride.

Figure 4:
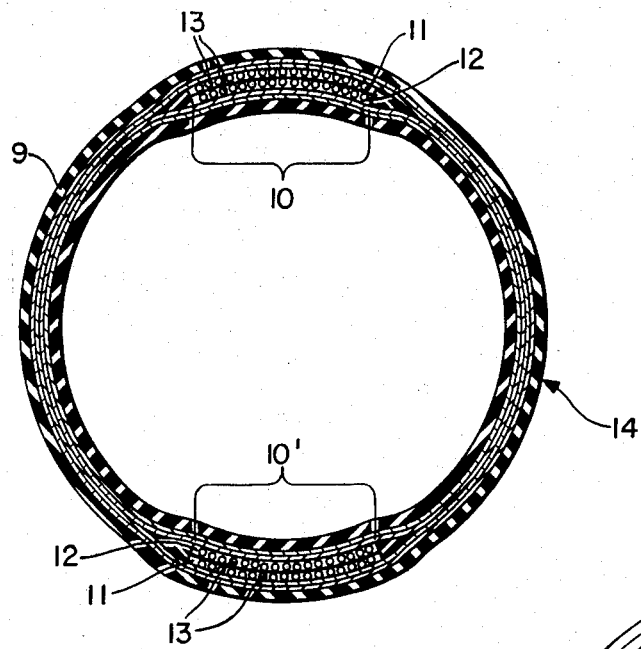
FIG. 4 is a modification of the invention shown in FIG. 2.

The body 4 further includes a pair of longitudinally reinforced portions or strips 7 and 7' disposed on diametrically opposite sides of the cross section of the body 4. Each portion 7 and 7' has at least one elongated reinforcing member 8 embedded therein extending generally parallel to the longitudinal axis of the hose to provide the hose with longitudinal strength. The reinforcing members 8 are preferably in the form of a plurality of reinforcing cords of materials conventionally used for reinforcing elastomeric hose or conduits. Accordingly, the cords 8 are comprised of at least one material selected from the group consisting of nylon, rayon, polyester, fiber glass and metal. The cords 8 may be laid in place in the hose body 4 individually or may be incorporated therein in the form of a strip of textile or wire cord fabric as shown in FIG. 2. It is preferred that an equal number of cord members 8 be disposed in each portion 7 and 7' to provide a balanced symmetrical hose construction. The cords may be incorporated into the portions 7 and 7' in a single layer of individual parallel cords or be included within two or more layers if desired. For example, FIG. 4 shows a modification of the invention in which the hose body 9 includes diametrically opposite longitudinally reinforced portions 10 and 10' with each portion comprised of two parallel layers 11 and 12 of reinforcing members 13 to provide added longitudinal strength for the hose structure 14.

The hose body 4 also includes remaining portions 15 and 15' free of the reinforcing members 8 disposed adjacent to the longitudinally reinforced portions on each side thereof. The longitudinally reinforced portions 7 and 7' have a total combined circumferential dimension or perimeter equal to or less than the total combined perimeter of the remaining portions 15 and 15' of the cross section of the hose body 4 therebetween to provide a hose construction in which at least one-half of the hose 2 remains flexible in a longitudinal direction thereby enabling the hose 2 to be more easily reeled upon itself and less likely to develop kinks.

Figure 5:
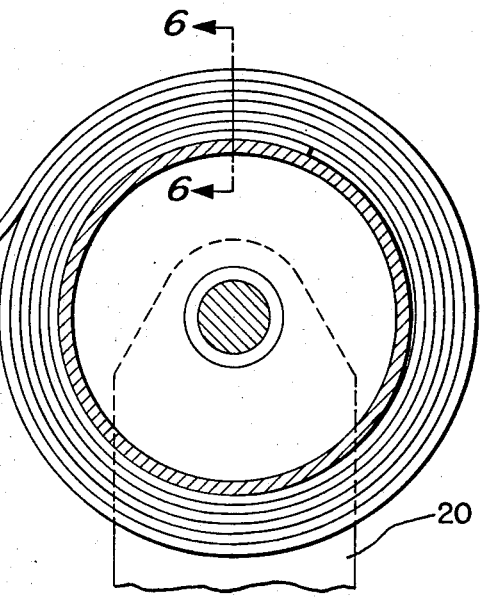
FIG. 5 is a side elevational view of the hose of FIG. 1 in a reeled condition prior to or after use in a refueling system.
Figure 6:
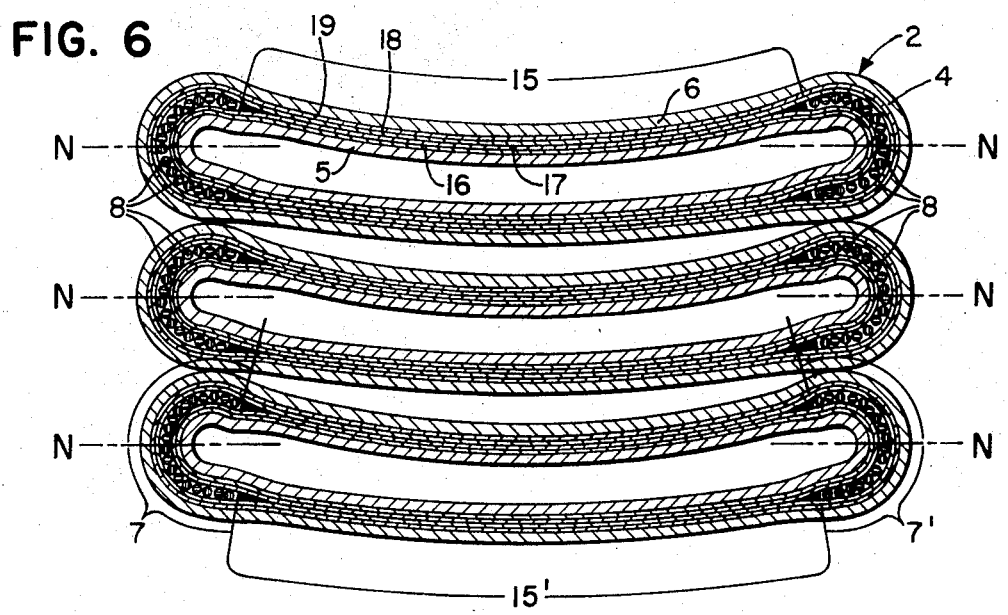
FIG. 6 is an enlarged sectional view taken on line 6—6 of FIG. 5.

As shown in FIG. 2, the portions 7 and 7' are disposed substantially at the neutral axis N of the hose. For the purposes of this invention, the term "neutral axis" designates that part of the cross section of the hose which is neither in tension nor compression when the hose is being deployed in use or is in a reeled condition. For example, when the hose 2 is floating in a body of water, the exact location of the neutral axis will vary; however, for purposes of illustration, in FIG. 2 the neutral axis N is shown aligned vertically with respect to the longitudinal axis of the hose. When the hose 2 is in a reeled condition as shown in FIGS. 5 and 6, the hose should be positioned so that the neutral axis N of the hose is substantially horizontally aligned for ease of reeling.

In the case of a hose of circular cross-sectional configuration, the longitudinally reinforced portions 7 and 7' should define a total combined arc A+A' of 180° or less. If the total combined arc of the portions 7 and 7' exceeds 180°, the hose will be of insufficient flexibility in a longitudinal direction to allow for easy coiling or reeling and distortion or kinking is more likely to develop. In this regard, it is preferred that each portion 7 and 7' extend in an arc a and a' respectively of about 45° or less on either side of the neutral axis N of the hose. It is even more preferred that the reinforced portions 7 and 7' define a total combined arc A+A' of 120° or less and that each portion 7 and 7' extend in an arc a and a' respectively of about 30° or less on each side of the neutral axis N of the hose. The particular arc defined by the longitudinally reinforced portions will depend to a large extent on the type of material of which the reinforcing cords are made. For example, a highly stretchable material such as nylon may necessitate a total combined arc length of near the maximum 180°. On the other hand, a material such as polyester or rayon may necessitate a total combined arc length of less than 120°. With material such as fiber glass or steel, the total combined arc length will be substantially less, for instance as low as 20° or less.

The hose 2 also preferably includes a plurality of plies of reinforcing material made of textile fabric which extends generally circumferentially about the body 4 of the hose to provide necessary reinforcement against radial forces within the hose. The plies may be square woven or in cord form and are customarily spirally wrapped around the inner tube 5 of the hose. The longitudinal members or cords 8 may be disposed either above or below the reinforcing plies but are preferably interposed between any two plies of the reinforcing plies. For example, the hose body may include four cord plies 16, 17, 18 and 19 of reinforcement extending in a biased relationship to the cord members 8 with the cord members being interposed between the cord plies 17 and 18 as shown in FIG. 3 of the drawings. It has been found that a very satisfactory hose structure results with the use of nylon reinforcing cord plies and polyester cord members. The cord members may have a diameter of 0.050 of an inch and the reinforcing cord plies may have a thickness or diameter of 0.038 of an inch. Each portion 7 and 7' containing the cord members 8 may have a length or perimeter of about 2 inches resulting in a combined perimeter of about 4 inches and assuming an inside hose diameter of about 6 inches and a wall or body thickness of 0.440 of an inch, the portions 15 and 15' between the portions 7 and 7' respectively will each have a width or circumferential dimension of about 8 inches and a combined length or perimeter of about 16 inches. In this case, the portions 7 and 7' extend in an arc a and a' respectively of about 18° on each side of the neutral axis N of the hose 2 thereby defining a total combined arc A+A' of 72°. It is readily apparent that since the longitudinal reinforcing cords 8 are incorporated within a portion 7 and 7' of the cross section of the body 4 having a total combined width or circumferential dimension which is substantially less than the total combined width or circumferential dimension of the remainder of the cross section of the body 4 that a hose construction is provided in which a majority of the hose 2 remains flexible in a longitudinal direction thereby enabling the hose to be more readily reeled upon itself and less likely to develop kinks.

The utility of the invention is further illustrated with reference to FIGS. 5 and 6 of the drawings which shows the hose 2 either prior to or after use in its reeled condition on a reel 20. In this case as previously mentioned, the neutral axis of the hose is disposed generally horizontally with the flexible portions 15 and 15' of the hose 2 in a generally flattened condition to enable the hose to be more easily reeled upon itself.

In manufacturing the hose of this invention, conventional building techniques may be used which are well known in the art. For example, the various hose components may be assembled on a building mandrel and then vulcanized in any suitable manner such as by means of steam to form an integral composite hose structure.

It should be apparent to those skilled in the art that the present invention provides a hose structure for use in conveying or transporting materials which has sufficient longitudinal strength to withstand significant tension or tensile forces and to resist undue constriction of the hose opening but remains sufficiently flexible in a longitudinal direction to enable the hose to be easily reeled upon itself and less likely to distort or develop kinks. The hose of the present invention may be used not only for the purpose illustrated as a refueling hose, but may also be used in many other applications in which the above-named features are desirable. For example, the hose of the present invention may be used for transporting solid or semi-solid material such as cement.

While certain representative embodiments and details have been shown for the purpose of illustrating the invention, it will be apparent to those skilled in the art that various changes and modifications may be made therein without departing from the spirit or scope of the invention.

I claim:

1. A material transporting hose of integral construction comprising a body of flexible resilient material including at least one ply of reinforcing material extending generally circumferentially thereof to provide reinforcement against radial forces within the hose and an outer cover surrounding said reinforcing material, a pair of circumferentially spaced longitudinally reinforced portions providing primary resistance to elongation of the hose and constriction of the hose opening caused by excessive end loads, said portions surrounded by said cover so as to be disposed completely within said body on opposite sides of the cross section thereof, said portions each having at least one elongated stress-resisting reinforcing member embedded therein with said member extending generally parallel to the longitudinal axis of the hose and capable of withstanding substantial longitudinal tensile stresses applied to the end of the hose to provide the hose with longitudinal strength, and remaining portions free of said reinforcing members disposed adjacent to said longitudinally reinforced portions on each side thereof with said longitudinally reinforced portions having a total combined perimeter equal to or less than the total combined perimeter of the remaining portions of the cross-section of said body therebetween to provide a hose construction in which at least one-half of the hose remains flexible in a longitudinal direction thereby enabling the hose to be more easily reeled upon itself and less likely to develop kinks.

2. The hose as claimed in claim 1 wherein said longitudinally reinforced portions include a plurality of said members with substantially an equal number of said members in each portion to provide a balanced symmetrical hose construction.

3. The hose as claimed in claim 1 wherein each said longitudinally reinforced portion comprises at least two parallel layers of said members.

4. The hose as claimed in claim 1 wherein said body comprises a plurality of plies of reinforcing material therein and said members are interposed between any two said plies.

5. The hose as claimed in claim 1 wherein said members are reinforcing cords comprised of at least one material selected from the group consisting of nylon, rayon, polyester, fiber glass and metal.

6. The hose as claimed in claim 1 wherein said portions are disposed substantially at the neutral axis of said hose.

7. The hose as claimed in claim 5 wherein said reinforcing material extends in a biased relationship to said cords with said members being comprised of polyester and said reinforcing material being comprised of nylon.

8. The hose as claimed in claim 6 wherein said hose has a substantially circular cross-sectional configuration and said longitudinally reinforced portions define a total combined arc of 180° or less.

9. The hose as claimed in claim 8 wherein said longitudinally reinforced portions define a total combined arc of 120° or less.

10. The hose as claimed in claim 8 wherein each said portion extends in an arc of about 45° or less on each side of the neutral axis of the hose.

11. The hose as claimed in claim 9 wherein each said portion extends in an arc of about 30° or less on each side of the neutral axis of the hose.

12. A fluid transporting hose of a generally circular cross-sectional configuration having a reinforced body of flexible elastomeric material including an inner tube and an outer cover of elastomeric material and at least one ply of reinforcing material disposed between said tube and cover extending generally circumferentially about said body to provide reinforcement against radial forces within the hose, a pair of spaced longitudinally reinforced strips providing primary resistance to elongation of the hose and constriction of the hose opening caused by excessive end loads, said strips surrounded by said cover so as to be disposed completely within said body on diametrically opposite sides of the cross-section thereof, said cover having a substantially uniform thickness with no substantial protuberances therein, said strips including a plurality of elongated stress-resisting reinforcing cords embedded therein and disposed in at least one layer and extending generally parallel to the longitudinal axis of the hose with said cords capable of withstanding substantial longitudinal tensile stresses applied to the end of the hose to provide the hose with longitudinal strength with the remainder of the cross section of said body being free of said cords, said strips having a total combined circumferential dimension substantially less than the circumferential dimension of the remainder of the cross section of said body to provide an integral hose construction in which a majority of the hose remains flexible in a longitudinal direction thereby enabling the hose to be more easily reeled upon itself and less likely to develop kinks.

13. The hose as claimed in claim 12 wherein said body comprises a plurality of plies of reinforcing material therein and said strips are interposed between any two said plies substantially at the neutral axis of said hose.

14. The hose as claimed in claim 13 wherein said strips define a total combined arc of 180° or less.

15. The hose as claimed in claim 14 wherein said strips define a total combined arc of 120° or less.

16. The hose as claimed in claim 14 wherein each said strip extends in an arc of about 45° or less on each side of the neutral axis of the hose.

17. The hose as claimed in claim 16 wherein each said strip extends in an arc of about 30° or less on each side of the neutral axis of the hose.

* * * * *